July 3, 1962 J. M. BROWNLOW ETAL 3,042,619

FERRITE COMPOSITION FOR BISTABLE MAGNETIC CIRCUITS

Filed Dec. 31, 1959

INVENTORS
JAMES M. BROWNLOW
ERNEST C. SCHUENZEL

BY William J. Schelberg
AGENT 3,042,619

FERRITE COMPOSITION FOR BISTABLE MAGNETIC CIRCUITS

James M. Brownlow, Fishkill, and Ernest C. Schuenzel, Poughkeepsie, N.Y., assignors to International Business Machines Corporation, New York, N.Y., a corporation of New York Filed Dec. 31, 1959, Ser. No. 863,357
4 Claims. (Cl. 252—62.5)

This invention relates to novel compositions of matter in the class known as ferrospinels which exhibit magnetic properties especially desirable in application for bistable magnetic storage devices in computer mechanisms. More particularly, it relates to a new rectangular hysteresis loop ferrospinel system in which ZnO or its equivalents are present in high concentrations.

This application is a continuation-in-part of U.S. application Serial No. 706,175, filed December 30, 1957, now abandoned and assigned to the same assignee as this application.

In a copending application, Serial No. 686,215, filed September 15, 1957, and assigned to the same assignee as this invention, the ferrite system CdO—MnO—$Fe_2O_3$ was described. The magnetic characteristics of that system made it especially desirable for coincident flux memory systems.

This invention is based upon the discovery that the ferrite system MgO—MnO—$Fe_2O_3$, containing ZnO or its equivalents within a certain composition range described, exhibits useful magnetic properties for coincident current memory systems hitherto unobtainable with other known ferrite systems and compositions.

Among the objects of this invention is to provide a ferrite material which has a very low switching constant, of not more than about 0.7 oersted-microsecond or less.

Another object of this invention is to provide a ferrospinel having a high $B_r/B_s$ ratio.

Another object is to provide a novel mixed ferrospinel having a low drive current requirement, of the order of 0.3 ma. or less.

Another object of this invention is to provide a ferrospinel with a low switching time, and adapted to be directly driven by transistor components.

A specific object of this invention is to provide a ferrite composition adapted for use in coincident current mode and comprising a Zn—Mn—Mg ferrite composition.

Still another object is to provide improved ferrite compositions with such magnetic characteristics as to make them especially suitable for use in binary information handling systems and devices such as magnetic memory apparatus.

Other objects of the invention will be pointed out in the following description and claims and illustrated in the accompanying drawings, which disclose, by way of example, the principle of the invention and the best mode, which has been contemplated, of applying that principle.

Figure 1:
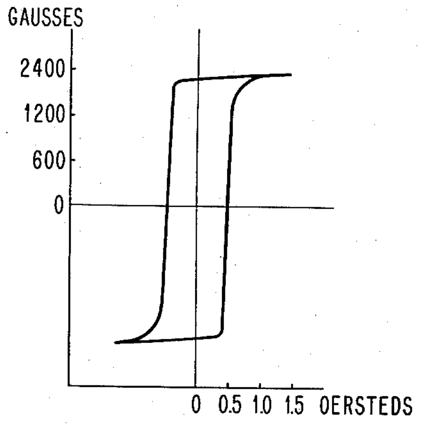
FIGURE 1 is a reproduction of an oscilloscope picture of the hysteresis loops obtained for the ferrospinels of the present invention (Code No. X–1069 in Table I) using a maximum applied field of 2.5 oersteds and a 60 cycle hysteresis graph.
Figure 2:
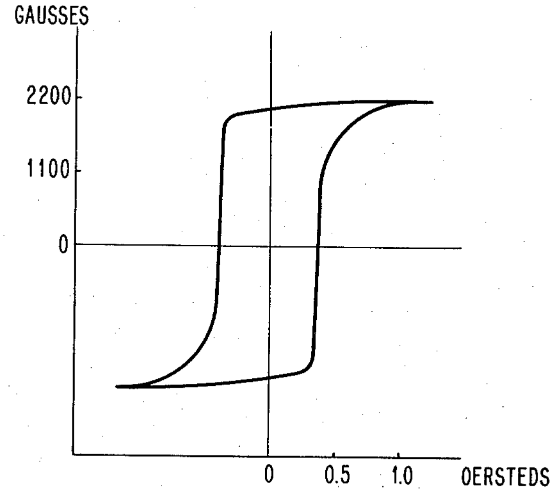
FIGURE 2 is an oscilloscope picture for a further ferrite of the present system (Code No. X–1059 in Table I) using a maximum applied field of 0.95 oersted.

Turning now to the figures, it is seen that the square knees persist even at high zinc oxide concentrations.

In a copending application, Serial No. 690,303, to J. M. Brownlow and B. R. Eichbaum, filed October 15, 1957, and assigned to the same assignee as the present application, it has been demonstrated that certain constituents of ferrospinels, including cadmium oxide and zinc oxide, undergo transformations during the sintering process which result in volatilization and loss of these constituents. Therefore, we have found it advantageous to carefully control the firing conditions in the preparation of the ferrospinels of the present invention. Conventional firing methods, for example, heating the presintered cores in an open boat under an oxidizing atmosphere at 1000–1200° C. for fifteen minutes to three hours, while it will produce square loop material, will result in a loss of zinc oxide. Such conventional firing methods also result in a concentration gradient in the zinc oxide constituent which has been found to be detrimental to the magnetic properties of cores formed from these ferrites. Therefore, to supplement conventional firing methods, there have been developed sintering techniques, described in more detail in the aforementioned copending application, which suppresses the volatilization of the zinc oxide portion of the ferrospinel and produces a ferrite having a homogeneous distribution of zinc oxide in the sintered core.

The novel method described in the above referred to copending application differs from previous methods in that the presintered cores are contained in a small platinum boat to which is added a separate quantity of ferrite powders of the same composition as the core material and in that the boat is provided with a platinum cover to keep excessive gaseous currents out of the boat. By using this technique, the composition of the presintered core will be essentially the same as the composition of the sintered core.

A preferred manner of preparing the ferrites of the present invention is the following: The ferrite powders are calcined at a temperature of approximately 1000° for a period of one or two hours and thoroughly mixed so as to form a homogeneous mixture of predetermined proportions. The mixture is subsequently ground so that the largest grain size is less than ten microns and a small percentage of lubricant material such as a monocrystalline wax or magnesium stearate and polyvinyl alcohol is added to reduce skin friction and warping during molding. The mixture is compacted in a steel die with sufficient pressure to form a closely coherent body, usually greater than 40,000 pounds per square inch. The pressed body is then calcined at 800–1000° C. to drive off the binder materials and moisture. The presintered body thus produced is enclosed in the covered receptacle as described, heated at 1000°–1650° C. in air for from 10 minutes to 24 hours, furnace cooled to about 850° C. during an additional 5–60 minutes and finally quenched to room temperature.

Using conventional heating and cooling cycles as well as the sintering cycles described immediately above, a number of compositions in the magnesium-manganese-zinc ferrite system were prepared. A summary of those compositions having the most desirable magnetic characteristics for computer type circuits is given in Table I. A comparison of magnetic properties is made with a typical magnesium-manganese ferrospinel commonly used in similar circuits. The ferrite bodies from which the properties listed below were established were toroidal in shape having an outside diameter of approximately 80 milli-inches, an inside diameter of approximately 50 milli-inches and a thickness of about 28 milli-inches.

The following definitions of terms may be helpful.

The $B_r/B_s$ ratio is the ratio of magnetic flux in the core at the remanence state to the magnetic flux at saturation.

$H_c$ may be defined as that applied magnetizing force which is necessary to reduce the induction, B, from the remanent value to zero. The switching constant, $S_W$, is defined according to the equation:

$$S_W = T_s \times (H - H_c)$$

where H is the applied magnetizing force and the other quantities are defined as before and below.

The discrimination ratio may be defined as the ratio of the voltage output obtained when a magnetic core is read out from the undisturbed "1" remanence state ($uV_1$) to the voltage output obtained when a positive half select pulse is applied to the core in the disturbed "0" remanence state ($dV_z$).

The switching time, $T_s$, was defined as the duration of the output voltage pulse, as measured between the 10% amplitude points when the core was driven by square current pulses.

*Table I*

| Code No. | Composition (Mol Percent) | | | | $B_s$ (gauss) | $B_r/B_s$ | $H_c$ (oersteds) | $S_w$ (oersted-micro-sec.) | $T_c$ (°/C.) | Sintering Cycle |
|---|---|---|---|---|---|---|---|---|---|---|
| | ZnO | MgO | MnO | $Fe_2O_3$ | | | | | | |
| X-1010 | 0 | 15.0 | 42.5 | 42.5 | 1,980 | 0.92 | 0.54 | 1.07 | 300 | 2 hours, 1,450°, $N_2$, cooled. |
| X-1022 | 1.0 | 14.9 | 42.1 | 42.0 | 2,723 | 0.98 | 0.56 | 1.40 | 268 | Slow to 1,620°, quenched. |
| X-1069 | 13.8 | 27.6 | 20.7 | 37.9 | 2,300 | 0.89 | 0.68 | 0.62 | 145 | 40 min., 1,270° C., furnace cooled to 850°, quenched. |
| X-1071 | 18.5 | 24.2 | 19.0 | 38.3 | 2,235 | 0.86 | 0.16 | 0.57 | 110 | 24 hours, 1,400°, $N_2$, cooled. |
| X-1078 | 19.3 | 20.2 | 20.2 | 40.3 | 2,300 | 0.86 | 0.16 | 0.76 | 115 | 1 hour, 1,440°, Slow cool. |
| X-1059 | 20.7 | 20.7 | 20.7 | 37.9 | 2,200 | 0.92 | 0.27 | 0.62 | 120 | 40 min., 1,270° C., furnace cooled to 850°, quenched. |
| X-1019 | 23.0 | 24.0 | 15.0 | 38.0 | 2,145 | 0.82 | 0.11 | 1.64 | 165 | 24 hours, 1,455°, slow quench. |

Table II summarizes the more significant pulse test data obtained from one composition (X-1069) in this ferrite system.

*Table II*

| | | |
|---|---|---|
| I (half select current) | ma | 434 |
| J (half select current) | ma | 266 |
| $uV_1$ (read out "1" output voltage) | mv | 109 |
| $dV_z$ (disturbed "0" output voltage) | mv | 33 |
| $uV_1/dV_z$ (discrimination ratio) | | 3.3 |
| $T_s$ (switching time) | μsec | 1.5 |

The unique attributes of this ferrite material are its large output voltage response when pulsed into the "one" state, fast switching time at low drive current pulse, low coercive force, and good square loop characteristics, especially in having square knees. With these magnetic properties, the ferrite materials of the present invention have found wide application as memory cores in computer memory devices, especially in coincident-current memory mechanisms, and as matrix switch cores.

Applicants have discovered that the addition of high concentrations of ZnO produces a ferrite system with excellent magnetic characteristics. On the other hand, it should be pointed out that when the ZnO content exceeds about 25 mol percent, the magnetic properties of the ferrite deteriorates and the cores thus produced are not as suitable as those wherein the ZnO content is between 13 to 25 mol percent. Moreover, if merely small amounts of ZnO are added to the magnesium-manganese ferrospinel system, only little improvement in its ferromagnetic properties is realized.

While an upper limit of zinc concentration in the sintered ferrite core of about 25 mol percent is described it must be emphasized that any heating conditions which permit a higher zinc oxide concentration in the presintered ferrite mixture to be reduced by volatilization to applicants' optimum concentration range in the sintered core is to be considered within the scope of the present invention.

While we have described the invention with particular reference to the improved ferrites produced by using 13-25 mol percent of ZnO in a Mg—Mn ferrite, as is known in the art, the equivalent CdO may be used in place of ZnO either in whole or in part. For example, Table III summarizes the pulse properties of the equivalent Cd containing ferrite cores within the same composition range prepared in the preferred manner described previously.

*Table III*

| Code No. | Composition (Mol Percent) | | | | $B_r/B_s$ | $uV_1$(mv.) | $uV_z$(mv.) | $uV_1/uV_z$ | $T_s$(μsec.) | $H_c$(oe.) |
|---|---|---|---|---|---|---|---|---|---|---|
| | $Fe_2O_3$ | MnO | CdO | MgO | | | | | | |
| MC-50 | 40 | 25 | 17.5 | 17.5 | 0.9 | 474 | 44.6 | 10.7 | 0.90 | 0.65 |
| MC-60 | 40 | 25 | 21.0 | 14.0 | 0.9 | 396 | 75.0 | 5.28 | 0.815 | 0.28 |
| MC-70 | 40 | 25 | 24.5 | 10.5 | 0.8 | 214 | 100.0 | 2.14 | 1.18 | 0.07 |
| MC-3 | 35 | 20 | 20.0 | 25.0 | 0.9 | 360 | 27.6 | 13.0 | 1.06 | ---------- |
| MC-4 | 45 | 20 | 20.0 | 15.0 | 0.9 | 362 | 61.2 | 5.92 | 1.14 | ---------- |

While the invention has been particularly shown and described with reference to preferred embodiments thereof, it will be understood by those skilled in the art that various changes in form and details may be made therein without departing from the spirit and scope of the invention.

What is claimed is:

1. A magnetic material consisting of the reaction product produced by heating together in a covered receptacle an intimate mixture of between 13-25 mol percent of an oxide selected from the group consisting of ZnO and CdO, 10-30 mol percent MgO, 12-35 mol percent MnO, and 30-45 mol percent $Fe_2O_3$ in a non-reducing atmosphere at a temperature within the range of 1000°-1650° C. from 15 minutes to 24 hours said material having a low switching constant of not more than about 0.7 oersted microsecond.

2. A magnetic material consisting essentially of the reaction product produced by heating together in a covered receptacle an intimate mixture of 13.8 mol percent ZnO, 27.6 mol percent MgO, 20.7 mol percent MnO, 40 mol percent $Fe_2O_3$, in a non-reducing atmosphere at a temperature within the range of 1000°-1650° C. from 15 minutes to 24 hours said material having a low switching constant of not more than about 0.7 oersted microsecond.

3. A magnetic material consisting essentially of the reaction product produced by heating together in a covered receptacle an intimate mixture of 19.3 mole percent ZnO, 20.2 mol percent MgO, 20.2 mol percent MnO, 40.3 mol percent $Fe_2O_3$, in a non-reducing atmosphere at a temperature within the range of 1000°-1650° C. from 15 minutes to 24 hours said material having a low switching constant of not more than about 0.7 oersted microsecond.

4. A magnetic material consisting essentially of the reaction product produced by heating together in a covered receptacle an intimate mixture of 13.8 mol percent ZnO, 27.6 mol percent MgO, 20.7 mol percent MnO, and 37.9 mol percent $Fe_2O_3$ in an air atmosphere at a temperature of 1270° C. for 40 minutes furnace cooled to almost 850° C. during an additional 15 minutes and finally rapidly quenching to room temperature said material having a low switching constant of not more than about 0.7 oersted microsecond.

References Cited in the file of this patent

UNITED STATES PATENTS

| | | |
|---|---|---|
| 2,549,089 | Hegyi | Apr. 17, 1951 |
| 2,565,861 | Leverenz et al. | Aug. 28, 1951 |
| 2,568,881 | Albers-Schoenberg | Sept. 25, 1951 |
| 2,715,109 | Albers-Schoenberg | Aug. 9, 1955 |
| 2,842,500 | Gibson et al. | July 8, 1958 |
| 2,885,365 | Oppegard | May 5, 1959 |

| | | |
|---|---|---|
| 2,950,251 | Weisz | Aug. 23, 1960 |
| 2,981,689 | Albers-Schoenberg | Apr. 25, 1961 |

FOREIGN PATENTS

| | | |
|---|---|---|
| 671,788 | Great Britain | May 7, 1952 |
| 730,703 | Great Britain | May 25, 1955 |
| 735,375 | Great Britain | Aug. 17, 1955 |
| 737,284 | Great Britain | Sept. 21, 1955 |
| 754,370 | Great Britain | Aug. 8, 1956 |
| 760,035 | Great Britain | Oct. 31, 1956 |
| 1,128,209 | France | Aug. 20, 1956 |
| 1,128,631 | France | Aug. 28, 1956 |
| 492,669 | Canada | May 5, 1953 |

OTHER REFERENCES

Economos, J. Amer. Ceramics Soc., July 1955, pages 241–244, August 1955, pages 292–297, October 1955, pages 353–357.